United States Patent
Schulter (10) Patent No.: US 11,468,591 B2
(45) Date of Patent: Oct. 11, 2022

(54) SCENE ATTRIBUTE ANNOTATION OF COMPLEX ROAD TYPOGRAPHIES

(71) Applicant: NEC Laboratories America, Inc., Princeton, NJ (US)

(72) Inventor: Samuel Schulter, New York, NY (US)

(73) Assignee: NEC Corporation

( * ) Notice: Subject to any disclaimer, the term of this patent is extended or adjusted under 35 U.S.C. 154(b) by 214 days.

(21) Appl. No.: 16/890,123

(22) Filed: Jun. 2, 2020

(65) Prior Publication Data
US 2020/0394814 A1    Dec. 17, 2020

Related U.S. Application Data

(60) Provisional application No. 62/860,874, filed on Jun. 13, 2019.

(51) Int. Cl.
| | |
|---|---|
| *G06T 7/70* | (2017.01) |
| *G06N 20/00* | (2019.01) |
| *G06N 5/04* | (2006.01) |
| *G06K 9/62* | (2022.01) |
| *G06V 20/56* | (2022.01) |

(52) U.S. Cl.
CPC .............. *G06T 7/70* (2017.01); *G06K 9/6262* (2013.01); *G06K 9/6267* (2013.01); *G06N 5/04* (2013.01); *G06N 20/00* (2019.01); *G06V 20/588* (2022.01); *G06T 2207/10044* (2013.01); *G06T 2207/20081* (2013.01); *G06T 2207/30256* (2013.01)

(58) Field of Classification Search
CPC .. G06K 9/6262; G06K 9/6267; G06K 9/6263; G06T 2207/10044; G06T 2207/20081; G06T 2207/30256; G06T 7/70; G06N 20/00; G06N 5/04; G06N 3/08; G06V 20/588

See application file for complete search history.

(56) References Cited

U.S. PATENT DOCUMENTS

| | | | |
|---|---|---|---|
| 10,169,678 B1 | 1/2019 | Sachdeva et al. | |
| 2017/0134722 A1* | 5/2017 | Okouneva | B60R 1/00 |
| 2018/0373980 A1 | 12/2018 | Huval | |
| 2019/0180612 A1* | 6/2019 | Demiryurek | G08G 1/0129 |
| 2019/0311220 A1* | 10/2019 | Hazard | G06K 9/6257 |
| 2020/0098135 A1* | 3/2020 | Ganjineh | G06T 7/74 |
| 2021/0191407 A1* | 6/2021 | Benisch | G06N 20/00 |

(Continued)

OTHER PUBLICATIONS

Wang, Z. et al., "A Parametric Top-View Representation of Complex Road Scenes" CVPR (Apr. 2019) pp. 10325-10333.

(Continued)

*Primary Examiner* — Ian L Lemieux
(74) *Attorney, Agent, or Firm* — Joseph Kolodka (57) ABSTRACT

Systems and methods for road typology scene annotation are provided. A method for road typology scene annotation includes receiving an image having a road scene. The image is received from an imaging device. The method populates, using a machine learning model, a set of attribute settings with values representing the road scene. An annotation interface is implemented and configured to adjust values of the attribute settings to correspond with the road scene. Based on the values of the attribute settings, a simulated overhead view of the respective road scene is generated.

20 Claims, 8 Drawing Sheets

(56) References Cited

U.S. PATENT DOCUMENTS

2021/0347377 A1* 11/2021 Siebert ................ G05D 1/0088

OTHER PUBLICATIONS

Seff, A. et al., "Learning from Maps: Visual Common Sense for Autonomous Driving" arxiv:1611.08583v2 (Dec. 2016) pp. 1-7.

Schulter, S. et al., "Learning to Look around Objects for Top-View Representations of Outdoor Scenes" arxiv: 1803.10870v1 (Mar. 2018) pp. 1-28.

Wang, Z. et al., "A Dataset for High-level 3D Scene Understanding of Complex Road Scenes in the Top-View" CVPR (Apr. 2019) pp. 1-4.

* cited by examiner

SCENE ATTRIBUTE ANNOTATION OF COMPLEX ROAD TYPOGRAPHIES

RELATED APPLICATION INFORMATION

This application claims priority to U.S. Provisional Patent Application No. 62/860,874, filed on Jun. 13, 2019, incorporated herein by reference herein its entirety.

BACKGROUND

Technical Field

The present invention relates to modeling road networks, and more particularly to generating scene attribute annotations for complex road typologies.

Description of the Related Art

Automated automobile navigation systems benefit from reliable and accurate models of road typologies. The road typologies, such as number of lanes, presence of crosswalks and sidewalks, intersections, etc. can be considered as scene attributes of a road segment.

Given global positioning system (GPS) data, some information about a road layout can be determined, but it may not be accurate. A highly accurate GPS is expensive, and map data accuracy is not guaranteed. Such data is often incomplete and road layout information is not coupled with images. Thus, if the map is outdated, the image taken can conflict with what the map information pertaining to the road layout.

In addition, it is often difficult to generate accurate scene attributes in sufficient number to reliably represent a complex road typology. Thus, an adequate volume of road typology training data to train machine learning systems, for example, can be difficult to collect.

SUMMARY

According to an aspect of the present invention, a method for road typology scene annotation is provided. The method includes receiving an image having a road scene. The image is received from an imaging device. Additionally, the method populates, using a machine learning model, a set of attribute settings with values representing the road scene. An annotation interface is implemented and configured to adjust values of the attribute settings to correspond with the road scene. Based on the values of the attribute settings, a simulated overhead view of the respective road scene is generated.

According to another aspect of the present invention, a system for road typology scene annotation is provided. The system includes a computer readable storage medium embodying computer readable instructions, and a processor device configured to implement a classification model based on the computer readable instructions. The processor device is further configured to receive an image having a road scene from an imaging device. Additionally, the processor device populates, using the classification model, a set of attribute settings with values representing the road scene. The processor device also implements an annotation interface configured to adjust values of the attribute settings to correspond with the road scene. Based on the values of the attribute settings, the processor device generates a simulated overhead view of the respective road scene.

According to yet another aspect of the present invention, a non-transitory computer readable storage medium including a computer readable program for road typology scene annotation is provided. The computer readable program, when executed on a computer causes the computer to receive an image having a road scene. The image is received from an imaging device. Additionally, the computer readable program causes the computer to populate, using a machine learning model, a set of attribute settings with values representing the road scene. Also, the computer readable program causes the computer to implement an annotation interface configured to adjust values of the attribute settings to correspond with the road scene. Based on the values of the attribute settings, the computer readable program causes the computer to generate a simulated overhead view of the respective road scene.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Training machine learning models, such as classification models, to recognize complex road typologies, road scenes that have accurate annotations of the scene attributes are provided. Examples of scene attributes include number of lanes, width of lanes, existence of and distance to sideroads and crosswalks, traffic direction, etc. These attributes describe both semantic and geometric properties of scenes, which enable a reconstruction of the road typology shown in an image or video as a top-view (or bird's eye view).

Being able to automatically infer scene attributes for particular road typologies can enable application of some embodiments in the automotive industry. Some embodiments can also find application in the insurance industry, for example, as a tool for reconstructing accidents scenes. One example from the automotive industry is blind-spot reasoning, which gives warnings to drivers if areas of the scene that need the driver's attention are occluded. Additionally, blind-spot reasoning can be important for realizing self-driving vehicles.

However, automatically inferring scene attributes that accurately describe a road scene from sensory input, such as cameras, for example, can be a difficult task, but can be attempted with a combination of techniques from the fields of computer vision and machine learning. To build such systems, a large corpus of training data may be needed that includes input-output pairs, where the input can be an image or video, and the output can be accurate scene attributes describing the input. Obtaining input images or videos can be accomplished by mounting a camera on a vehicle. However, obtaining the scene attributes can involve direct human annotation efforts. This can be a costly and laborious process.

Figure 1:
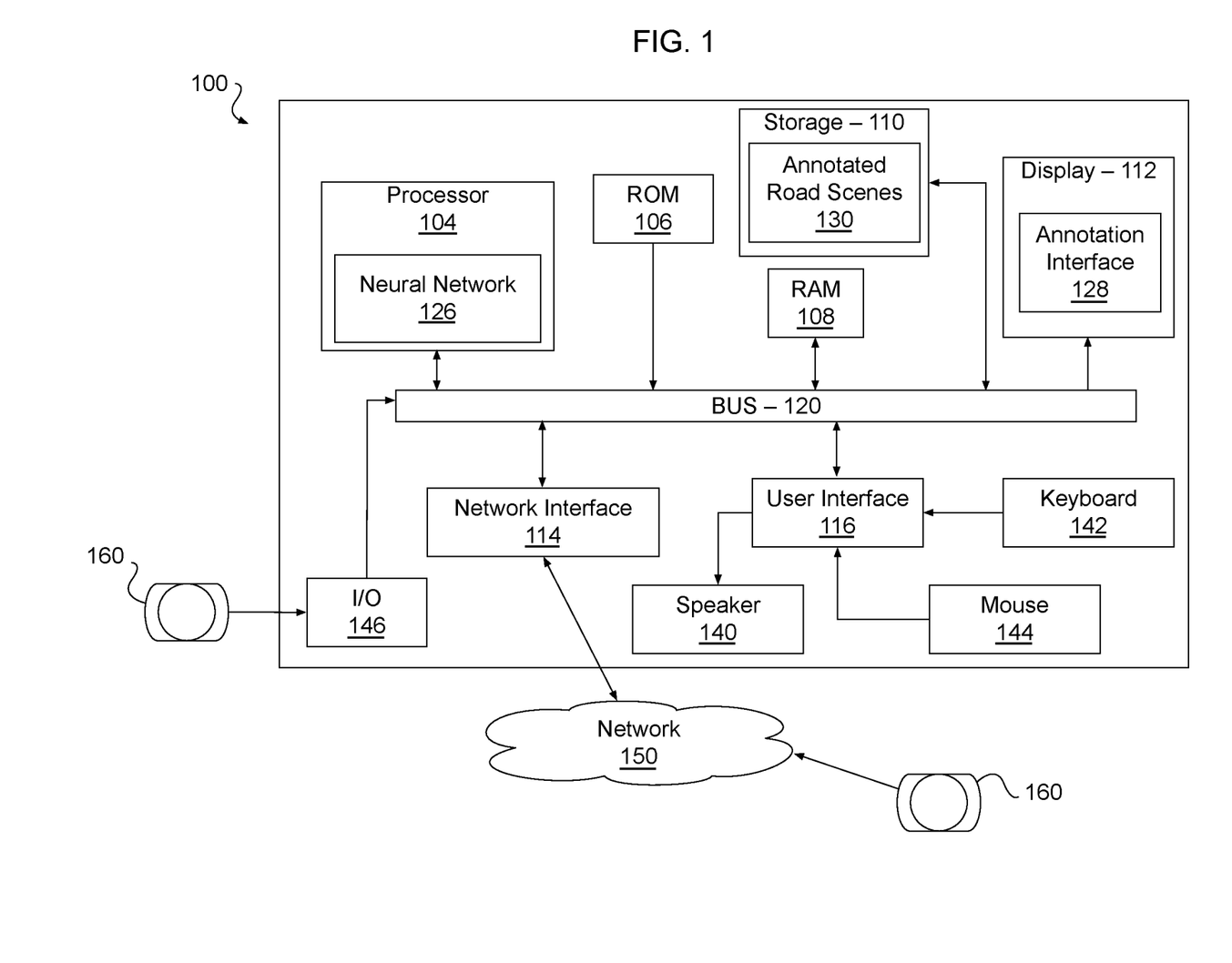
FIG. 1 is a block representation of a high-level system for road typology scene annotation, in accordance with an embodiment of the present invention.

FIG. 1 shows a system 100 configured, according to an embodiment of the present invention, to implement a scene attribute annotation system 100. The system 100 includes a processor 104, such as, a central processing unit (CPU), a graphical processing unit (GPU), a configured field programmable gate array (FPGA), an application specific integrated circuit (ASIC), or a combination of these, for example. In some embodiments, the processor 104 implements the functionality of a neural network 126, forming a machine learning model, such as a classification model, configured to identify road typologies from received images, for example.

The classification model or models (126) can include models that can be trained with simulated data or trained with both simulated and real data, or trained with real data, where real data was annotated with a modeling tool (e.g., annotation tool 128, 130) employed for annotating collected data. In one example, a user can first train the model with simulated data only, then extract predicted attributes from the real images that can be annotated, and then load the annotation tool with these values. A human annotator or automatic annotator can be employed to fill out the rest of the data and correct any mistakes.

The processor 104 is in communication, via a system bus 120, with memory devices, such as random-access memory (RAM) 106, and read-only memory (ROM) 108. The system bus 120 is also coupled to one or more mass storage devices 110, such as, for example, hard drives, solid state drives, etc. A display 112, user interface controller 116 and network interface 114 are also coupled to the system bus 120. The user interface controller 116 provides an interface between the system 100 and a user by way of various human interface devices (HID) such as, for example, keyboard 142, mouse 144, speakers 140, etc. The network interface 114 transmits and receives data communication between the system 100 and external devices, such as one or more imaging sensors 160, via a network 150. However, in some embodiments, imaging sensors 160 that generated image data including road scenes can be directly connected to the system 100 by way of a serial connection (e.g., universal serial bus (USB), IEEE RS232 serial, and similar) or other data input/output (I/O) interface 146. The storage device 110 can be configured to store annotated road scenes 130. The store annotated road scenes 130 can, in some embodiments, be stored in one or more databases. In other embodiments, the annotated road scenes 130 can be stored in a plurality of flat files. For example, the layout of complex driving scenes can be obtained from a single camera. Given a perspective image that captures a 3D scene, a prediction of a rich and interpretable scene description can be derived, which represents the scene in an occlusion-reasoned semantic top-view.

The network 150 can be a local area network (LAN), wide area network (WAN), Internet, or a combination of these. Additionally, the network 150 can be configured using any of the IEEE 802 family of networking protocols, for example, such as Ethernet (IEEE 802.3), Wireless LAN (IEEE 802.11), etc. and transmit data using, for example, Transmission Control Protocol (TCP), User Datagram Protocol (UDP), etc.

Figure 2:
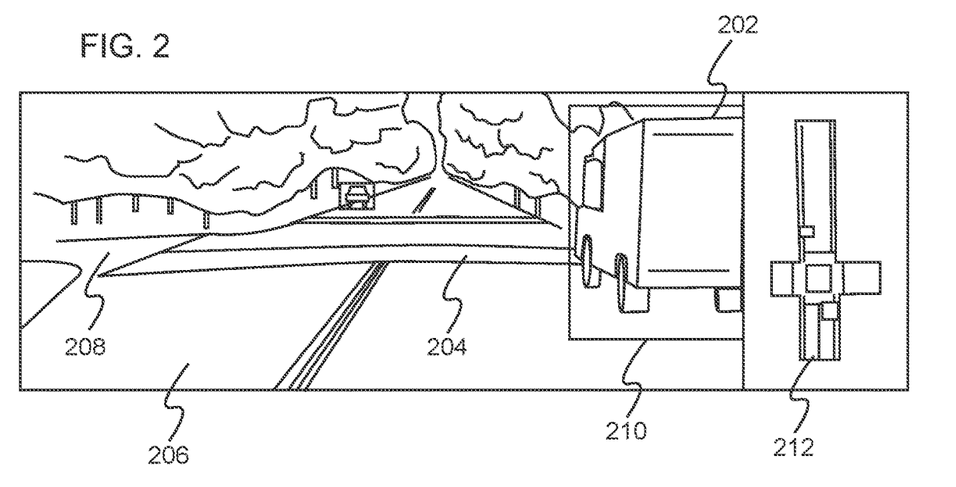
FIG. 2 is a representation of an image including a road scene, in accordance with an embodiment of the present invention.

In an example of an image with a road scene is shown in FIG. 2. In FIG. 2, a truck 202 is occluding a sidewalk and a crosswalk 204, which is automatically inferred by predicting correct scene attributes. A pedestrian crossing the road 206 may not become visible to a driver until the driver's vehicle is too close to avoid an impact. Additionally, the truck 202 partially obscures a cross street 208. In a situation where the vehicle is automated or includes early warning alerts, a proper analysis of the scene attributes can be used to focus attention on the automatically detected dangerous area of the scene: the truck 202. For example, the truck 202 can be highlighted by a surrounding box 210 and a top-down view of the road scene 212 can be presented to a driver such that the automated systems can be made aware of the road typology and hazards.

Figure 3:
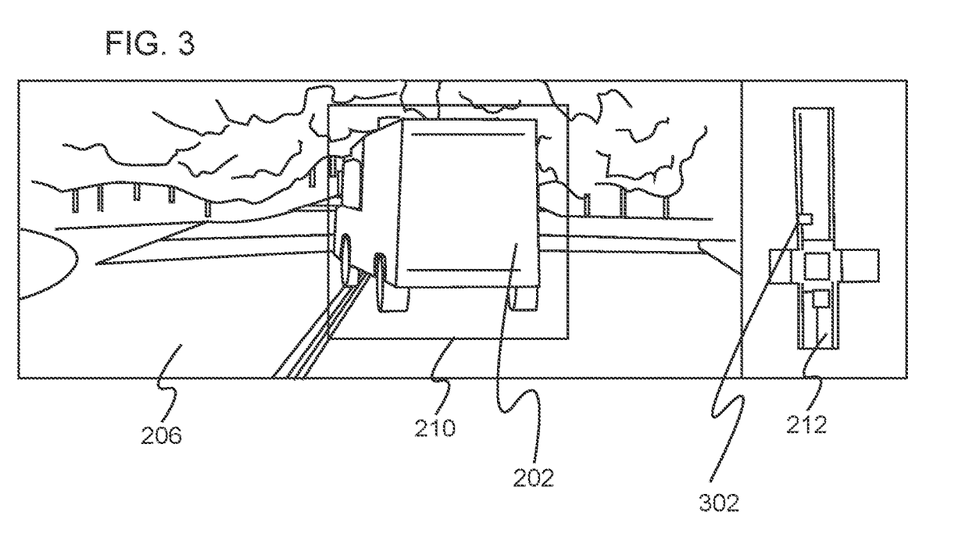
FIG. 3 is a representation of an image including another road scene, in accordance with an embodiment of the present invention.

In another example road scene image, shown in FIG. 3, the truck 202 occludes a potentially oncoming automobile 302 (shown on the top-down view), which can be dangerous if either the driver or the oncoming vehicle intends to turn left. Neither vehicle has a clear line of sight to the other vehicle and thus a potentially hazardous situation can develop.

Figure 4:
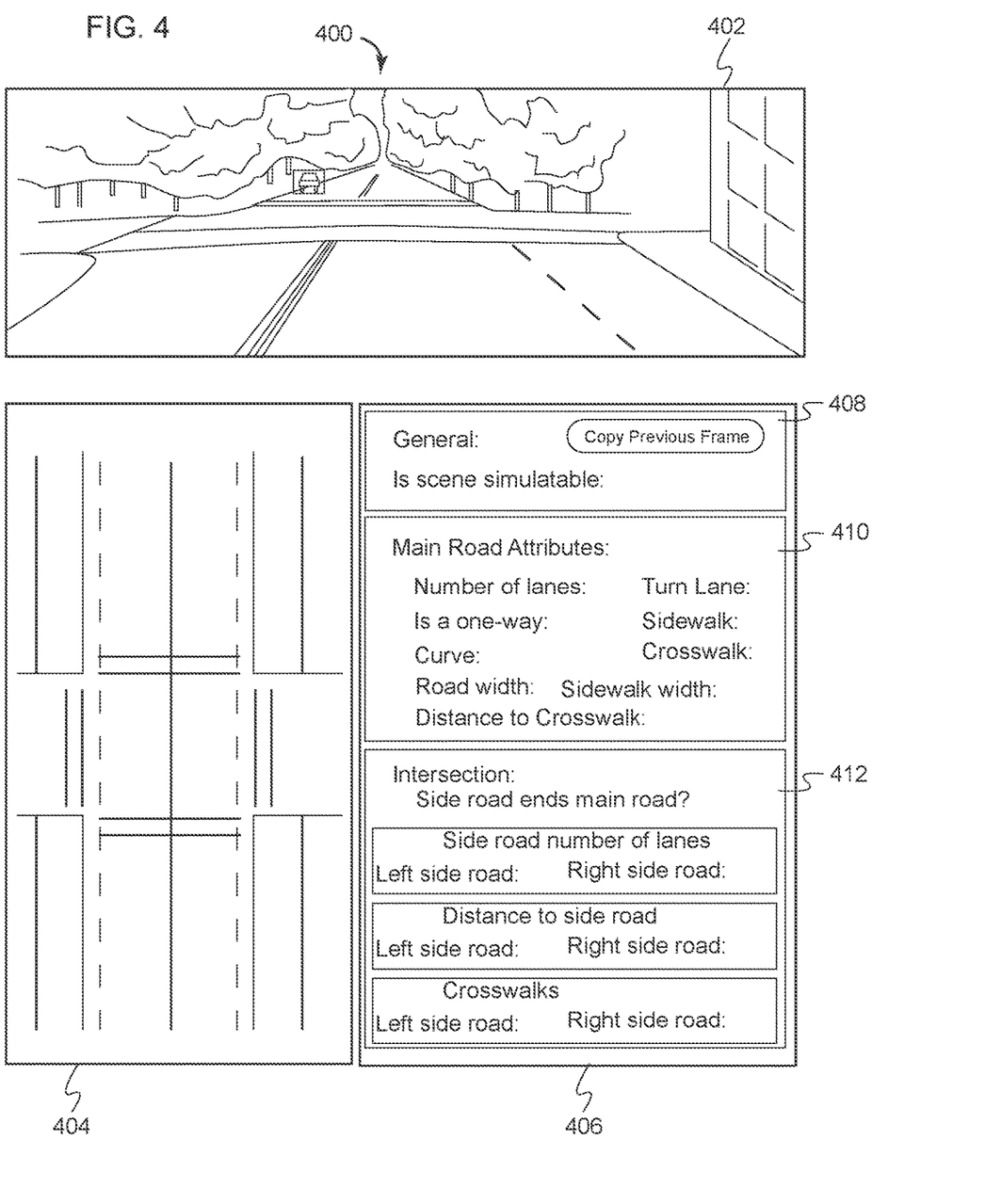
FIG. 4 is a representation of an annotation interface for road typology scene annotation, in accordance with an embodiment of the present invention.

To annotate scene attributes for an outdoor driving scene, an embodiment of the present invention, shown in FIG. 4, includes an annotation tool 400. The annotation tool 400 presents an image 402 of a road scene. Additionally, the annotation tool 400 includes a simulation or rendering 404 of the road typology depicted in the image 402. In some embodiments, the annotation tool 400 can be configured to initially populate the attributes form 406 with attribute values identified in the image 402. In other embodiments, the attributes form 406 is blank initially, awaiting input from an individual, e.g., an annotator. In some embodiments, the attributes form 406 can be organized into a plurality of sections, such that related attributes are grouped into the same section. The sections can be displayed as individual blocks, such as "General" 408, "Main Road Attributes" 410, "Intersection" 412. In other embodiments, the sections can be implemented as separate tabs or sheets (not shown) within the attributes form. The attributes form 402 shows a variety of attributes in each of the section blocks, however, the attributes shown are intended as illustrative, and do not encompass all the attributes that can be included in the attributes form 406 nor the groupings with which any specific attribute is to be associated.

Attributes of a road scene can include, e.g., number of lanes, type of lanes (HOV), one-way street, additional lanes in opposing driving direction, turning lane, curved road, straight road, rotation of main road, delimiter width between driving directions on main road, sidewalk, curb or other delimiter, crosswalk, distance to this crosswalk, side roads (none, left, right, both), T-intersection, intersection delimiter, etc. These attributes could be simulated, real or combinations. Note that there can be other attributes as well, instead of or in additional to these. For example, one could annotate the existence and location of traffic lights and traffic signs.

Values provided to the annotation tool 400, by way of attribute values input on the attributes form 406, directly affect the displayed rendering 404. In this way, an annotator can readily verify that the attribute values correctly represent the road typology shown in the image 402 by inspection and comparison of the rendering 404 against the image 402. In some embodiments, a change to a value of an attribute in the attributes form 406 is immediately reflected in the rendering 404, allowing an annotator to readily identify erroneous attribute values as the values are being entered. In one embodiment, each time a user makes any change in the interface form 406, all values of the form are sent to the processor 104, which takes all values and renders the scene from scratch. Note that this is not like in a game engine where rendering requires proper lighting and shading details to generate a photo realistic image. It is a relatively simple piece of code (e.g., ~1000 lines of Python code) that takes all the attributes and creates the top-view image. This can run in the order of milli-seconds or less and is so efficient that the network transmission is likely slower than the rendering itself.

In some embodiments, the annotation tool 400 provides validation algorithms to verify that attribute values are feasible given the values of other related or dependent attributes. For example, an attribute value for a width of a traffic lane in a multilane road cannot be greater than an attribute value for the width of the road. When two or more attribute values conflict with each other, the annotation tool 400 can highlight the conflicting attributes by, for example, encircling the attribute values in a contrasting color (e.g., red). The attribute validation can include if/else statements in code to verify conditions. One example can include: when looking at the annotation form: Setting "crosswalk on left sideroad" to "yes" would incur an error if "side road left num lanes" is set to "0". Another example can include: Setting "side-road-ends-main-road" to "Yes" would incur an error if there is no side road, i.e., "side-road-left-num-lanes" and "side-road-right-num-lanes" are both "0".

Figure 5:
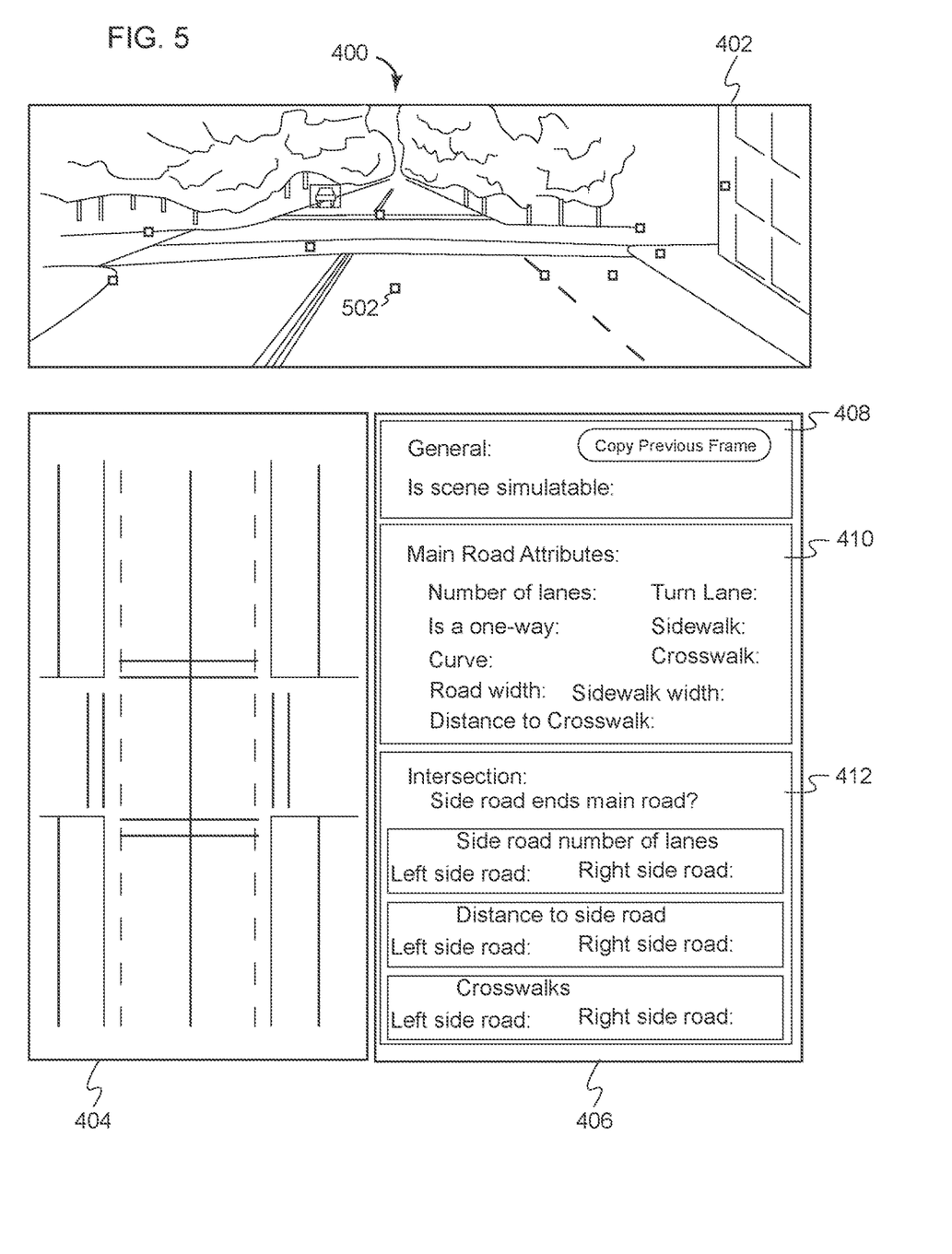
FIG. 5 is a representation of an annotation interface for road typology scene annotation, in accordance with another embodiment of the present invention.

In some embodiments, the image 402 can be overlaid with depth data 502 for a plurality of regions or pixels, as shown in FIG. 5. The depth data 502 can be generated based on data acquired from a light detection and ranging (LIDAR) system. In other embodiments, a stereo imaging system can be employed to generate both the display image 402 and the depth data 502. The depth data 502 can be viewed by the annotator to determine certain attribute values that include geometric estimates of the scene, such as width of road, distance to an intersection, and the like, for example.

In one example, RGB images along with depth data coming from the LIDAR 3D scanner can be employed. The scanner can also be mounted on the car and shoot laser rays, which are reflected, and the distance can be measured. The laser scanner and the camera can be calibrated, and this permits alignment with any 3D point with the captured RGB image, e.g., the distance to some pixels of the RGB image can be determined. Another option can include the use of a stereo setup, e.g., two cameras side-by-side on the car. With this setup, one can also compute the depth to many pixels in the images.

In general, depth/distance comes from a 3D point in the real world and it resides in some coordinate system, e.g., the coordinate system of the laser. Given calibration between the RGB camera and the laser, one can move the 3D point into the cameras coordinate system and project to the image plane. This then tells us the location of the 3D point in the image (pixel) as well as the distance.

Additionally, the annotation tool 400 can, in some embodiments, annotate sequences of frames (e.g., video segments, or sequential images) instead of single unrelated images. A low framerate of a video segment can be selected at which annotation processing by the annotation tool 400, which can allow the system to copy attributes from a previous frame to a current frame in a video segment without any modifications in many cases. The reason is that several attributes stay constant over a longer period of time, for example, the existence of sidewalks. Moreover, annotating at a lower framerate increases the variability of the data for a fixed amount of annotations.

The lower framerate can increase variability if we have a fixed budget of images that are to be annotated. Consider a video with framerate of 1000 frames per second. Annotating the first 1000 frames only gives annotations for 1 second of the actual video, but not much happens in 1 second. The car did not drive far within 1 second and the scene is likely the same. Also, the first image and the second image in that video are barely different because only 1 millisecond has passed.

Take the same video but with the frame rate reduced to 1 frame per second. In this case, annotating 1000 frames means we see 1000 seconds of the video (compared to 1 second with the larger frame rate). In this case, we should see higher variations of the actual video content because after 1000 seconds the car we are in drove longer distance and the scene probably has changed. In this case, we get larger data variability with the same number of annotated frames.

Figure 6:
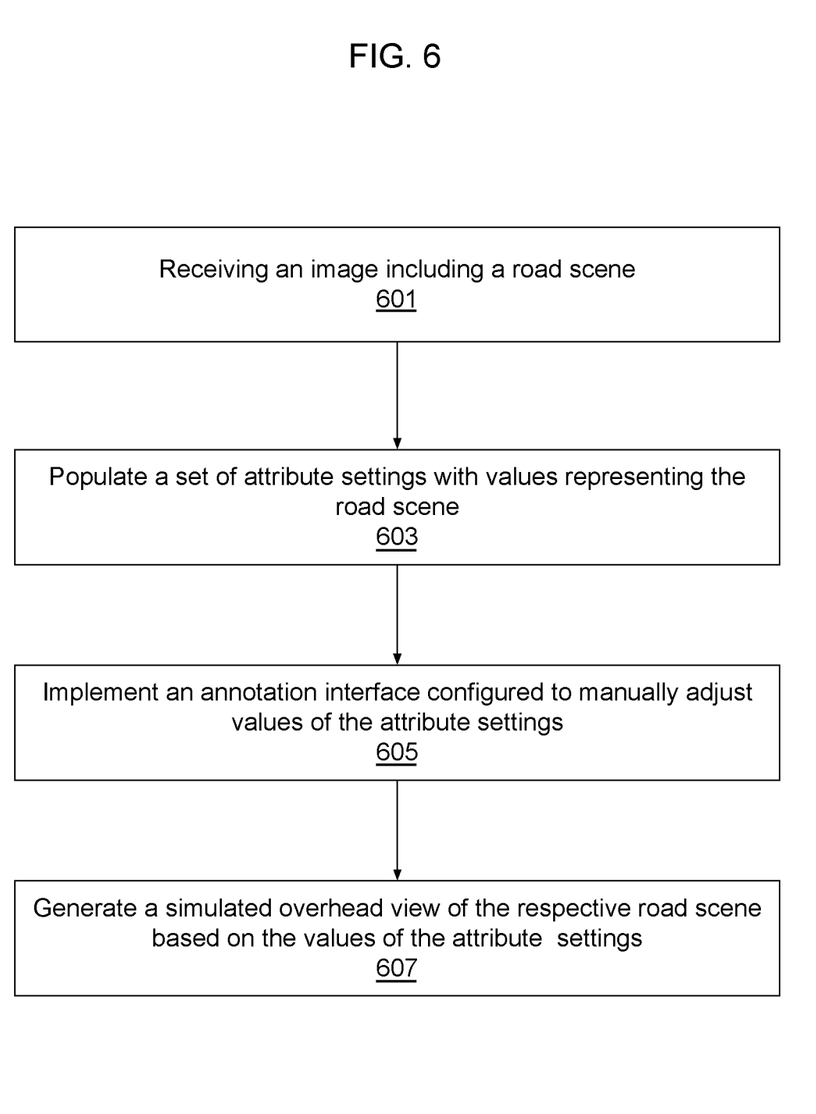
FIG. 6 is a flow diagram illustrating a method for road typology scene annotation, in accordance with another embodiment of the present invention.

Turning to FIG. 6, a computer-implemented method is shown for implementing an annotation tool in accordance with an embodiment of the present invention. At block 601, an image, such as the image 402 shown in FIG. 4, for example, is received that includes a road scene recorded by an imaging device, such as the camera 160 shown in FIG. 1. The image 402 can be in the form of individual images or as a segment of video. Additionally, some embodiments can be configured to receive the image data 402 directly from the camera 160, while other embodiments can be configured to access a data storage device (e.g., storage 110 of FIG. 1) to retrieve previously stored image data. The image data can include depth data as well.

Alternatively, the depth data can be received separately. In cases where the depth data is separate from the image data, an identifier can be provided to both the image data and the depth data to associate the depth data with the corresponding image data.

At block 603, the method includes populating a set of attribute settings, such as the attribute settings 406 of FIG. 4, for example, with values representing the road scene depicted in the image 402. A machine learning model, such as the neural network 126 shown in FIG. 1, for example, can be implemented to analyze the image 402 and depth data received in block 601 and provide the attribute values for the attribute settings 406. In a model training environment, the attribute values provided by the machine learning model 126 may initially be incorrect. However, as the machine learning model 126 learns, the attribute values provided by the machine learning model 126 will be more accurate.

At block 605, the method implements an annotation interface, such as the annotation interface 128 shown in FIG. 1, for example, configured to allow an annotator to adjust values of the attribute settings 406 to correspond with the road scene in the image 402. The adjustment of the attribute settings 406 can, in some embodiments, be performed manually by an annotator. The annotation interface 128 can be used to correct erroneous attribute values provided by the machine learning model 126, as well as allow the annotator to input attribute values for which the machine learning model 126 may not have provided values.

At block 607, the annotation tool 400 generates a simulated overhead view (e.g., birds-eye view), for example, the rendering 404 of FIG. 4, of the respective road scene based on the attribute values provided either by the machine learning model 126 or the annotator by way of the annotation interface 128. In some embodiments the simulated overhead view 404 can be generated based on the initial attribute values provided by the machine learning model 126. The simulated overhead view 404 can be updated as additional attribute values are added, or as initial attribute values are corrected by the annotator via the annotation interface 128. Thus, in some embodiments, the execution of block 607 can occur concurrently with block 603 and block 605. In other embodiments, block 607 is executed upon completion of attribute value entry by the annotator at block 605. Completion of block 605 can be signaled by way of actuation of a graphical user interface (GUI) element, such as a button labeled as "validate" or the like.

In some embodiments, once the method shown in FIG. 6 completes for an image 402 or series of related images 402, the machine learning model 126 can be configured to analyze the final validated attribute values in comparison to the initial values input by the machine learning model 126. In this way, the machine learning model 126 can be trained to better recognize road typologies from images 402.

Figure 7:
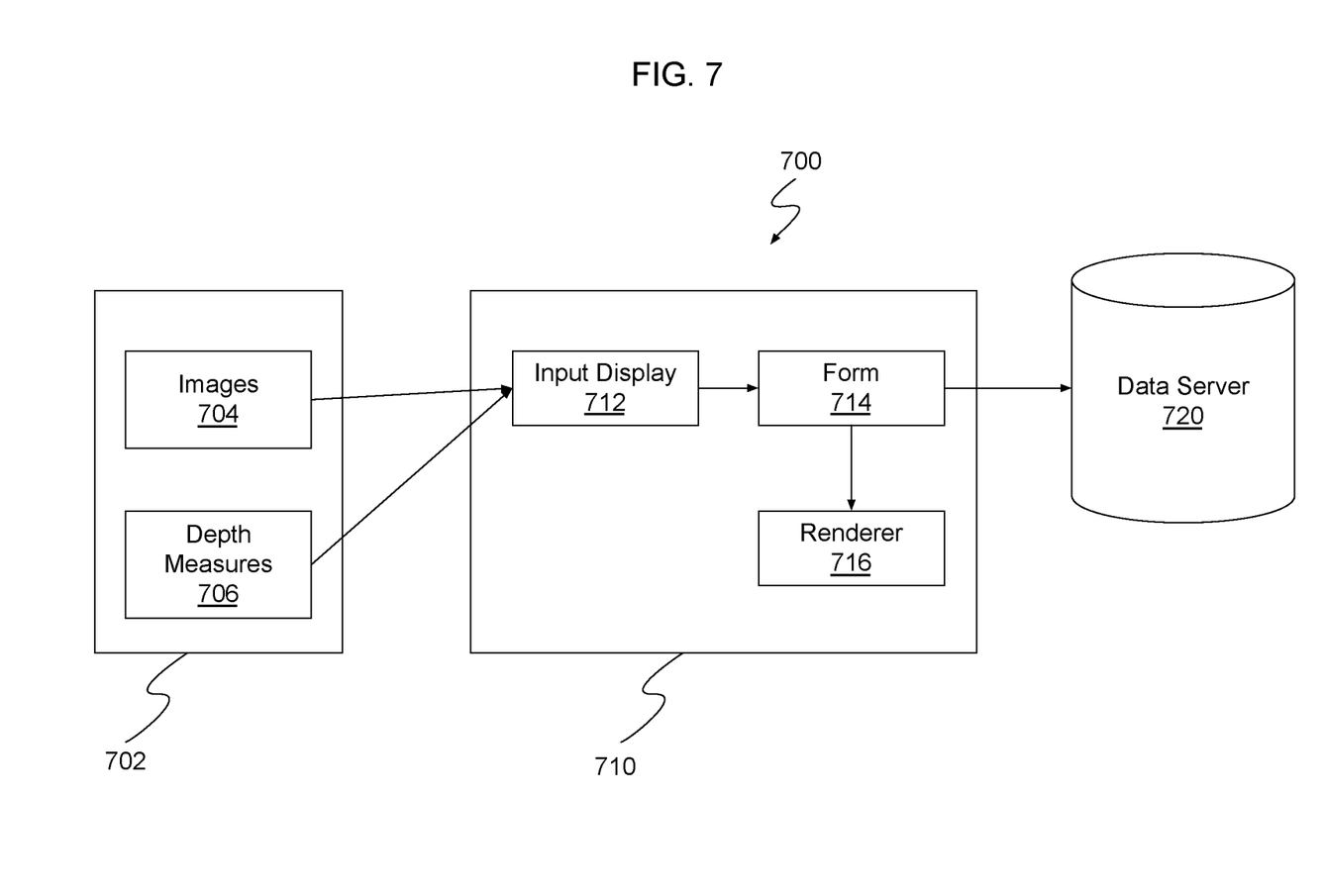
FIG. 7 is a block representation of system for road typology scene annotation, in accordance with another embodiment of the present invention.
Figure 8:
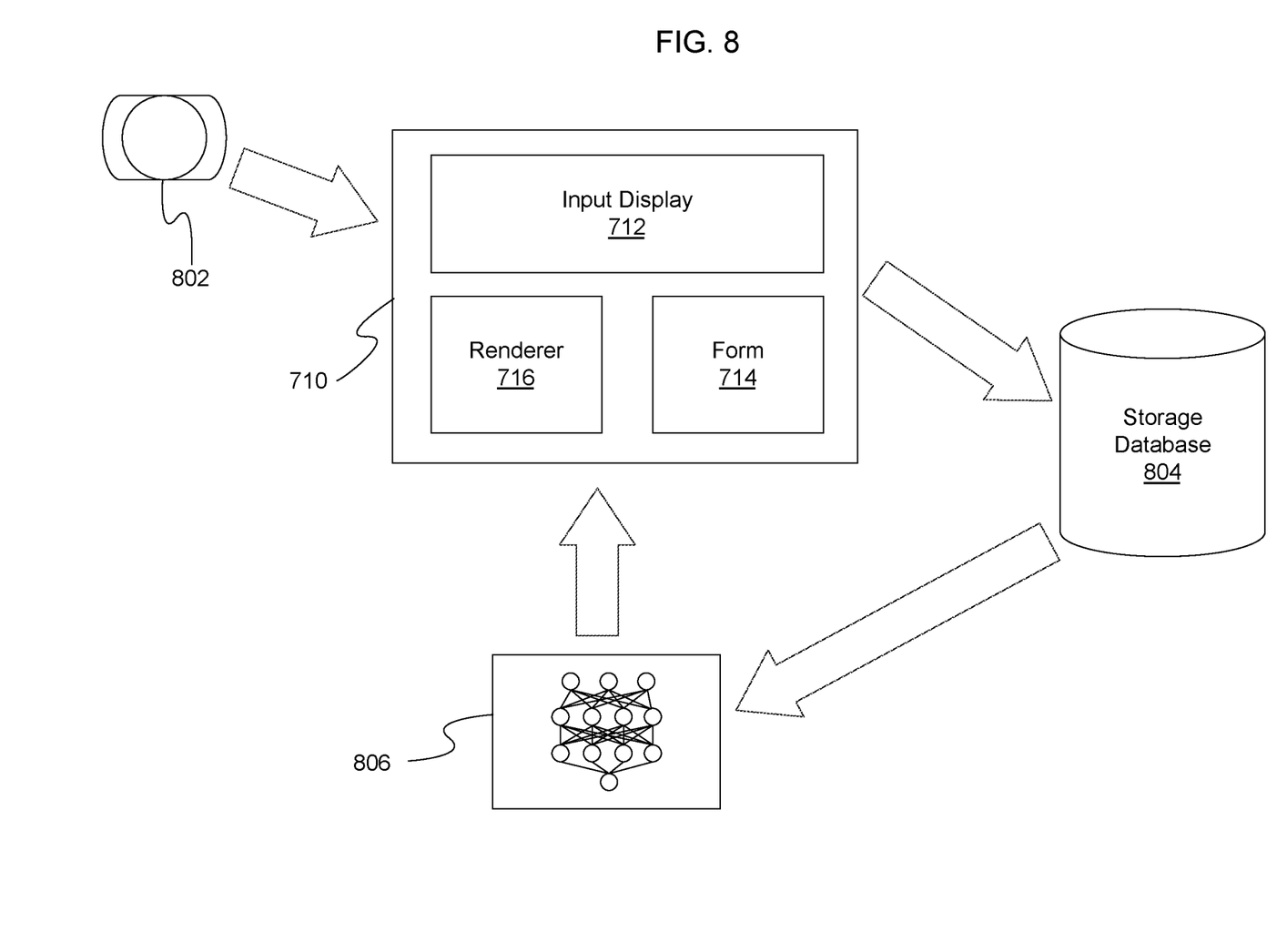
FIG. 8 is a block representation of system for road typology scene annotation used for training a machine learning model, in accordance with another embodiment of the present invention.

In other embodiments, shown in FIG. 7 and FIG. 8, the annotation tool 700 is configured to generate training data sets from images that include road scenes. The annotation tool 700 includes an annotation interface 710 and a data server 720. The annotation interface 710 receives input data 702, including images 704 and depth measurements 706. In some embodiments, the input data 702 can be generated by a camera 802, as shown in FIG. 8, that is equipped with, e.g., a LIDAR system configured to generate associated depth measurements. In other embodiments, the camera 802 and LIDAR system (not shown) can be provided as separate components of the annotation tool 700. In still other embodiments, the camera 802 generates stereoscopic images from which depth measurements can be derived.

The input data 702 is displayed on an input display 712 of the annotation interface 710. An annotator viewing the input display 712 can enter attribute values into an attribute settings form 714. Based on the entered attribute values, a renderer 716 generates a simulated road typology that presents a top-down view of the road shown in the image displayed on the input display 712. Once the annotator is satisfied that the simulated road typology generated by the renderer 716 represents the image displayed on the input display 712, the annotated image and simulated road typology can be stored in the data server 720. In this embodiment, the annotated image and simulated road typology can be retrieved by a machine learning model 806, shown in FIG. 8. being trained to recognize road typologies, and used as a training data set.

In some embodiments, the annotation tool 700 can look for already existing annotations in, for example, previous image frames 704 in a sequence or previously saved version of the current image frame 704. If existing annotations are found, the annotation tool 700 can load the existing attributes into the form 714. However, if there are no existing annotations, the annotation tool 700 can fill the attribute settings form 714 with default values for the scene attributes.

The input display 712 can show the perspective image 704 to the annotator. The image 704 can be a full color (e.g., RGB) image, or a monochrome (e.g., grayscale) image. Additionally, in some embodiments the input display 712 can overlay the depth measurements 706 for one or more pixels in the corresponding image 704. Depth measurements 706 need only be provided for a subset of pixels in the image 704, which is sufficient to accurately annotate the scene attributes. In an embodiment, the depth measurement 706 for a pixel can be shown above the image (e.g., as text) when the mouse pointer hovers over that pixel. The pixel can be highlighted, for example, in red so that an annotator can readily identify pixels having associated depth measurements 706. Also, a GUI element, such as a button, can be provided on the annotation interface 710, allowing the annotator to view all pixels that are associated with a depth measurement 704.

The attribute settings form 714 can include a combination of text fields, check boxes and drop-down lists. As described above, the attribute settings form 714 may be filled when loaded if some annotation already exists for the image. Changing any value of the scene attributes can invoke the renderer 716 to generate a simulated road using the attributes.

The renderer 716 renders a top-down view according to the current values of the scene attributes from the attribute settings form 714. The renderer 716 can be invoked each time the attribute values in the attribute settings form 714 change, thus providing the annotator with immediate feedback.

The data server 720 includes a storage database 804, shown in FIG. 8. In some embodiments, the storage database 804 can be cloud storage. In other embodiments, the storage database 804 can be embodied in a local set of storage devices accessible by the annotation interface 710 by way of a local area network (LAN). In yet another embodiment, the storage database 804 can be embodied in one or more storage devices directly coupled to the annotation interface 710.

Figure 9:
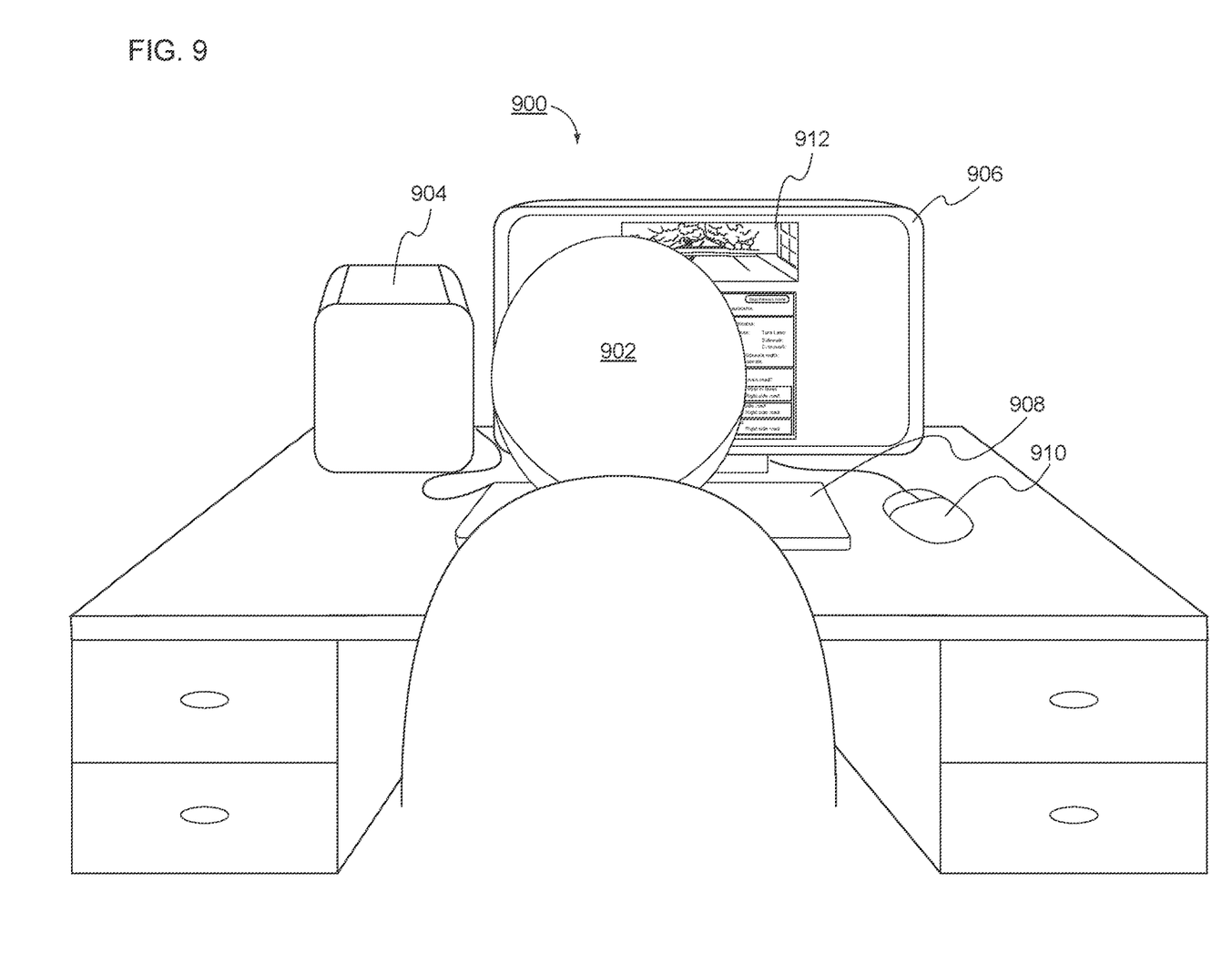
FIG. 9 illustrates a graphical user interface embodiment of the present invention in a practical application.

Turning to FIG. 9, a workstation 900 used by an annotator 902 to implement an embodiment of the present invention. The workstation 900 can include a computer 904 coupled to a display device 906. Additionally, user interface devices, such as a keyboard 908 and a mouse 910, for example, can be provided to allow user interaction between the annotator 902 and the workstation 900. The computer 904 can include the components shown in FIG. 1, for example, and the display device 906 can correspond with display 112 of FIG. 1 as well. The display device 906 is configured to display an embodiment of the annotation interface 912, such as the annotation interface 400 shown in FIG. 4 and FIG. 5.

FIG. 9 shows an embodiment of the present invention configured as a desktop style workstation 900. However, in other embodiments, the annotation tool of the present invention can be implemented in a tablet form factor, where the computer 904 and the display device are combined into a unitary body that can be held by an individual. Moreover, the user interface devices, e.g., the keyboard 908 and mouse 910, can be implemented by way of a touch sensitive surface overlay disposed on the display device 906 and an onscreen keyboard graphical element. Further, a camera can be provided on the tablet as well. The tablet form factor of this embodiment can facilitate image annotation in the field, such as when the annotation tool is used by an insurance adjustor or a police officer to document a scene of a vehicle accident, for example.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLA).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for road typology scene annotation, comprising:
   receiving an image including a road scene from an imaging device;
   populating, using a machine learning model, a set of attribute settings with values representing the road scene, the set of attribute settings describing both semantic and geometric properties of the road scene;
   implementing a web-based annotation interface to manually adjust values of the attribute settings to correspond with the road scene;
   displaying a web form directly adjacent the road scene, the web form including a combination of text fields, check boxes, and drop-down lists;
   filling out the web form with all the manually adjusted values, the web form saved to a web server;
   annotating a sequence of frames at a low framerate to allow copying of attributes from the set of attribute settings from a previous frame to a current frame of a video segment of the road scene; and
   generating a simulated overhead view of the respective road scene based on the values of the attribute settings.

2. The computer-implemented method as in claim 1, wherein the web-based annotation interface provides validation algorithms to verify that the values of the set of attribute settings are feasible given values of other related or dependent attributes.

3. The computer-implemented method as in claim 1, further comprising associating distance measurements with the road scene shown in the image.

4. The computer-implemented method as in claim 3, wherein the distance measurements are recorded using a light detection and ranging (LIDAR) system.

5. The computer-implemented method as in claim 3, wherein the distance measurements are super-imposed onto the image to form a composite image, the composite image being displayed in the interface.

6. The computer-implemented method as in claim 1, wherein at least two attributes of the attribute settings are related.

7. The computer-implemented method as in claim 6, further comprising constraining acceptable values of a first attribute of the two related attributes based on a value assigned to a second attribute of the two related attributes, wherein the acceptable values of the first attribute change in response to changes to the value of the second attribute.

8. A system for road typology scene annotation, comprising:
   a non-transitory computer readable storage medium embodying computer readable instructions; and
   a processor device implementing a classification model based on the computer readable instructions, the processor executing the steps of:
      receiving an image including a road scene from an imaging device;
      populating, using a machine learning model, a set of attribute settings with values representing the road scene, the set of attribute settings describing both semantic and geometric properties of the road scene;
      implementing a web-based annotation interface to manually adjust values of the attribute settings to correspond with the road scene;
      displaying a web form directly adjacent the road scene, the web form including a combination of text fields, check boxes, and drop-down lists;
      filling out the web form with all the manually adjusted values, the web form saved to a web server;
      annotating a sequence of frames at a low framerate to allow copying of attributes from the set of attribute settings from a previous frame to a current frame of a video segment of the road scene; and
      generating a simulated overhead view of the respective road scene based on the values of the attribute settings.

9. The system as in claim 8, wherein the web-based annotation interface provides validation algorithms to verify that the values of the set of attribute settings are feasible given values of other related or dependent attributes.

10. The system as in claim 8, wherein the processor associates distance measurements with the road scene shown in the image.

11. The system as in claim 10, wherein the distance measurements are recorded using a light detection and ranging (LIDAR) system.

12. The system as in claim 10, wherein the distance measurements are super-imposed onto the image to form a composite image, the composite image being displayed in the interface.

13. The system as in claim 8, wherein at least two attributes of the attribute settings are related.

14. The system as in claim 13, wherein the processor constrains acceptable values of a first attribute of the two related attributes based on a value assigned to a second attribute of the two related attributes, wherein the acceptable values of the first attribute change in response to changes to the value of the second attribute.

15. A non-transitory computer readable storage medium comprising a computer readable program for road typology scene annotation, wherein the computer readable program when executed on a computer causes the computer to perform the method comprising:
   receiving an image including a road scene;
   populating, using a machine learning model, a set of attribute settings with values representing the road scene, the set of attribute settings describing both semantic and geometric properties of the road scene;
   implementing a web-based annotation interface to manually adjust values of the attribute settings to correspond with the road scene;
   displaying a web form directly adjacent the road scene, the web form including a combination of text fields, check boxes, and drop-down lists;
   filling out the web form with all the manually adjusted values, the web form saved to a web server;
   annotating a sequence of frames at a low framerate to allow copying of attributes from the set of attribute settings from a previous frame to a current frame of a video segment of the road scene; and
   generating a simulated overhead view of the respective road scene based on the values of the attribute settings.

16. The note-transitory computer readable storage medium as in claim 15, wherein the web-based annotation interface provides validation algorithms to verify that the values of the set of attribute settings are feasible given values of other related or dependent attributes.

17. The non-transitory computer readable storage medium as in claim 15, further comprising associating distance measurements with the road scene shown in the image.

18. The non-transitory computer readable storage medium as in claim 17, wherein the distance measurements are recorded using a light detection and ranging (LIDAR) system.

19. The non-transitory computer readable storage medium as in claim 17, wherein the distance measurements are super-imposed onto the image to form a composite image, the composite image being displayed in the interface.

20. The non-transitory computer readable storage medium as in claim 15, wherein at least two attributes of the attribute settings are related and further comprising constraining acceptable values of a first attribute of the two related attributes based on a value assigned to a second attribute of the two related attributes, wherein the acceptable values of the first attribute change in response to changes to the value of the second attribute.

* * * * *